United States Patent
Fong et al.

(10) Patent No.: US 9,563,718 B2
(45) Date of Patent: Feb. 7, 2017

(54) USING INTERACTIVE SCRIPTS TO FACILITATE WEB-BASED AGGREGATION

(75) Inventors: Spencer W. Fong, Redwood City, CA (US); Richard M. Ng, Needham, MA (US); Thomas E. Dockman, Aurora, OH (US); Rodney A. Robinson, Los Altos, CA (US); Marvin Mah, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 1749 days.

(21) Appl. No.: 11/771,217

(22) Filed: Jun. 29, 2007

(65) Prior Publication Data

US 2009/0006985 A1    Jan. 1, 2009

(51) Int. Cl.
| | |
|---|---|
| G06F 17/30 | (2006.01) |
| G06Q 40/02 | (2012.01) |
| H04W 88/04 | (2009.01) |
| H04W 12/08 | (2009.01) |
| H04W 12/06 | (2009.01) |
| H04L 29/06 | (2006.01) |

(52) U.S. Cl.
CPC ......... G06F 17/30905 (2013.01); G06Q 40/02 (2013.01); *H04L 63/08* (2013.01); *H04L 63/083* (2013.01); *H04L 63/0823* (2013.01); *H04W 12/06* (2013.01); *H04W 12/08* (2013.01); *H04W 88/04* (2013.01)

(58) Field of Classification Search
CPC .. G06F 17/30905; G06Q 40/025; G06Q 40/02
USPC .......................... 715/760, 825, 743; 716/825
See application file for complete search history.

(56) References Cited

U.S. PATENT DOCUMENTS

| | | | | |
|---|---|---|---|---|
| 5,544,246 | A * | 8/1996 | Mandelbaum et al. | 705/65 |
| 5,649,118 | A * | 7/1997 | Carlisle et al. | 705/41 |
| 5,671,354 | A * | 9/1997 | Ito et al. | 726/3 |
| 5,878,398 | A * | 3/1999 | Tokuda et al. | 705/7.26 |
| 5,881,234 | A * | 3/1999 | Schwob | H04L 12/14 709/219 |
| 5,898,835 | A * | 4/1999 | Truong | 709/217 |
| 6,009,429 | A * | 12/1999 | Greer et al. | |
| 6,038,541 | A * | 3/2000 | Tokuda et al. | 705/7.13 |
| 6,044,142 | A * | 3/2000 | Hammarstrom et al. | 379/223 |
| 6,385,642 | B1 * | 5/2002 | Chlan et al. | 709/203 |
| 6,401,073 | B1 * | 6/2002 | Tokuda et al. | 705/7.26 |
| 6,449,636 | B1 * | 9/2002 | Kredo et al. | 709/206 |

(Continued)

FOREIGN PATENT DOCUMENTS

| | | | | |
|---|---|---|---|---|
| EP | 1118944 A1 * | 7/2001 | | G06F 15/00 |
| FR | 2812096 A1 * | 1/2002 | | G06F 9/06 |

*Primary Examiner* — Jeffrey A Gaffin
*Assistant Examiner* — John M Heffington
(74) *Attorney, Agent, or Firm* — Patterson + Sheridan, LLP

(57) ABSTRACT

Some embodiments of the present invention provide a system that facilitates interactivity during automated website accesses. During operation, the system executes a script which automatically accesses one or more websites. While executing the script, the system retrieves user-specific data associated with a user. The system then uses the user-specific data to access a target website. While accessing the target website, the system receives an interactivity request which the system presents to the user. The system then receives a response to the interactivity request from the user, and forwards the response to the website.

18 Claims, 2 Drawing Sheets

(56) References Cited

U.S. PATENT DOCUMENTS

| | | | |
|---|---|---|---|
| 6,460,038 B1* | 10/2002 | Khan et al. | |
| 6,832,240 B1* | 12/2004 | Dutta | 709/203 |
| 6,871,221 B1* | 3/2005 | Styles | H04L 41/0843 709/220 |
| 6,931,419 B1* | 8/2005 | Lindquist | 707/792 |
| 6,966,060 B1* | 11/2005 | Young et al. | 717/177 |
| 6,976,210 B1* | 12/2005 | Silva et al. | 715/205 |
| 6,986,062 B2* | 1/2006 | Carpenter | 726/3 |
| 7,051,119 B2* | 5/2006 | Shafron | G06F 17/30873 709/203 |
| 7,076,730 B1* | 7/2006 | Baker | 715/210 |
| 7,080,037 B2* | 7/2006 | Burger et al. | 705/50 |
| 7,287,031 B1* | 10/2007 | Karpf et al. | |
| 7,302,568 B2* | 11/2007 | von Behren | G06F 21/53 713/167 |
| 7,340,439 B2* | 3/2008 | Burger et al. | 705/65 |
| 7,421,731 B2* | 9/2008 | Mitchell et al. | 726/3 |
| 7,529,775 B2* | 5/2009 | Bluvshteyn et al. | |
| 7,849,137 B2* | 12/2010 | Joshi | 709/204 |
| 7,853,534 B2* | 12/2010 | Su | 705/67 |
| 7,895,275 B1* | 2/2011 | Evans et al. | 709/206 |
| 7,895,284 B2* | 2/2011 | Kim | 709/207 |
| 7,954,058 B2* | 5/2011 | Kalaboukis et al. | 715/753 |
| 8,060,574 B2* | 11/2011 | Evans et al. | 709/206 |
| 8,060,827 B2* | 11/2011 | Fischer et al. | 715/745 |
| 8,073,733 B1* | 12/2011 | Caland | 705/14.4 |
| 8,091,032 B2* | 1/2012 | Fischer | 715/751 |
| 8,176,191 B2* | 5/2012 | Fischer et al. | 709/231 |
| 8,185,584 B2* | 5/2012 | Fischer et al. | 709/204 |
| 8,190,639 B2* | 5/2012 | Cannon et al. | 707/785 |
| 8,209,631 B2* | 6/2012 | Kraft et al. | 715/811 |
| 8,219,631 B2* | 7/2012 | Kim | 709/207 |
| 8,250,485 B2* | 8/2012 | Spisak | 715/827 |
| 8,255,828 B2* | 8/2012 | Harris et al. | 715/810 |
| 8,260,882 B2* | 9/2012 | Kim et al. | 709/218 |
| 8,271,495 B1* | 9/2012 | Skrenta et al. | 707/738 |
| 8,286,089 B2* | 10/2012 | Hardy et al. | 715/772 |
| 8,291,343 B2* | 10/2012 | Kobayashi | 715/810 |
| 8,312,500 B2* | 11/2012 | Emerson et al. | 725/131 |
| 8,370,486 B2* | 2/2013 | Kim | 709/224 |
| 8,374,972 B2* | 2/2013 | Caland | 705/300 |
| 8,396,924 B2* | 3/2013 | Baldwin et al. | 709/205 |
| 8,463,893 B2* | 6/2013 | Clark | 709/224 |
| 8,468,253 B2* | 6/2013 | Guzman et al. | 709/227 |
| 8,478,783 B2* | 7/2013 | Cannon et al. | 707/785 |
| 8,533,798 B2* | 9/2013 | Schenk | H04L 63/10 455/411 |
| 2001/0049635 A1* | 12/2001 | Chung | 705/26 |
| 2002/0077957 A1* | 6/2002 | Ottow et al. | 705/37 |
| 2002/0091788 A1* | 7/2002 | Chlan et al. | 709/213 |
| 2002/0099665 A1* | 7/2002 | Burger et al. | 705/67 |
| 2002/0174107 A1* | 11/2002 | Poulin | 707/3 |
| 2002/0194226 A1* | 12/2002 | Sheth et al. | 707/517 |
| 2003/0050967 A1* | 3/2003 | Bentley | 709/203 |
| 2003/0220876 A1* | 11/2003 | Burger et al. | 705/50 |
| 2004/0039824 A1* | 2/2004 | Isoda | 709/227 |
| 2004/0083089 A1* | 4/2004 | Wade | 703/21 |
| 2004/0107415 A1* | 6/2004 | Melamed | G06F 11/3684 717/124 |
| 2004/0158722 A1* | 8/2004 | Carpenter | 713/182 |
| 2004/0158746 A1* | 8/2004 | Hu | G06F 21/41 726/8 |
| 2005/0044044 A1* | 2/2005 | Burger et al. | 705/50 |
| 2005/0050367 A1* | 3/2005 | Burger et al. | 713/202 |
| 2005/0060586 A1* | 3/2005 | Burger et al. | 713/201 |
| 2005/0108095 A1* | 5/2005 | Perlmutter | 705/14 |
| 2005/0108096 A1* | 5/2005 | Burger et al. | 705/14 |
| 2005/0160421 A1* | 7/2005 | Bluvshteyn et al. | 717/174 |
| 2005/0165626 A1* | 7/2005 | Karpf | 705/3 |
| 2005/0177753 A1* | 8/2005 | Carpenter | 713/201 |
| 2006/0031387 A1* | 2/2006 | Hamzeh et al. | 709/217 |
| 2006/0085766 A1* | 4/2006 | Dominowska et al. | 715/854 |
| 2006/0116924 A1* | 6/2006 | Angles et al. | 705/14 |
| 2006/0200425 A1* | 9/2006 | Steele et al. | 705/64 |
| 2006/0242404 A1* | 10/2006 | Su | 713/150 |
| 2007/0055884 A1* | 3/2007 | Rhoads | 713/176 |
| 2007/0073704 A1* | 3/2007 | Bowden et al. | 707/10 |
| 2007/0073843 A1* | 3/2007 | Ferreri | 709/219 |
| 2007/0088608 A1* | 4/2007 | Fogelson | 705/14 |
| 2007/0129955 A1* | 6/2007 | Dalmia et al. | 705/1 |
| 2007/0136378 A1* | 6/2007 | Karpf et al. | 707/104.1 |
| 2007/0169165 A1* | 7/2007 | Crull et al. | 725/135 |
| 2007/0174298 A1* | 7/2007 | Tanimoto | 707/10 |
| 2007/0180488 A1* | 8/2007 | Walter et al. | 725/135 |
| 2007/0208641 A1* | 9/2007 | Smith et al. | 705/35 |
| 2007/0220092 A1* | 9/2007 | Heitzeberg et al. | 709/204 |
| 2007/0220275 A1* | 9/2007 | Heitzeberg et al. | 713/186 |
| 2007/0251988 A1* | 11/2007 | Ahsan et al. | 235/375 |
| 2007/0265922 A1* | 11/2007 | Dumond et al. | 705/14 |
| 2007/0276732 A1* | 11/2007 | Lee et al. | 705/14 |
| 2008/0060061 A1* | 3/2008 | Deshpande | H04L 63/0823 726/5 |
| 2008/0114639 A1* | 5/2008 | Meek et al. | 705/10 |
| 2008/0115208 A1* | 5/2008 | Lee | 726/19 |
| 2009/0282467 A1* | 11/2009 | Schenk | 726/7 |
| 2010/0169173 A1* | 7/2010 | Vogels | 705/14.41 |

\* cited by examiner

USING INTERACTIVE SCRIPTS TO FACILITATE WEB-BASED AGGREGATION

BACKGROUND

Related Art

The present invention generally relates to systems that automatically aggregate data from websites.

Financial institutions typically provide websites that enable their customers to access account information on-line. Moreover, most people have accounts at a number of different financial institutions. For example, a person might have: (1) bank accounts at a bank, (2) credit-card accounts with different credit-card issuers, and (3) investment accounts with different brokerage firms. This means that the person must visit a number of different websites belonging to different financial institutions to determine their financial position accurately, which is a cumbersome and time-consuming process.

In order to speed up this process, a number of "account aggregation" systems have been developed to compile information from different accounts automatically. To use this type of system, a user typically provides account-access information (such as usernames and passwords) for various accounts, and the account-aggregation system uses this information to gather and compile the account information into a single presentation. These account-aggregation systems typically reside within a web-based application or within client-side software. Note that similar aggregation systems are also used to gather and compile other types of information, such as emails and news articles.

Unfortunately, existing aggregation systems navigate through websites in a programmed fashion that is "static." This means that such systems require data to be already stored (e.g., a username) and also require a website map which is already known. Such systems have problems dealing with "dynamic" situations, where user interaction is required.

SUMMARY

Some embodiments of the present invention provide a system that facilitates interactivity during automated website accesses. During operation, the system executes a script which automatically accesses one or more websites. While executing the script, the system retrieves user-specific data associated with a user. The system then uses the user-specific data to access a target website. While accessing the target website, the system receives an interactivity request which the system presents to the user. The system then receives a response to the interactivity request from the user, and forwards the response to the website.

In some embodiments, accessing the target website involves performing navigation operations through web pages in the target website.

In some embodiments, accessing the target website involves performing parsing operations to extract data from web pages in the target website.

In some embodiments, accessing the target website involves aggregating account information for the user from the target website.

In some embodiments, receiving the interactivity request involves receiving an interactivity object which can encapsulate different data types associated with different types of interactivity requests.

In some embodiments, presenting the interactivity request to the user involves presenting the interactivity object to the user. In some embodiments, the interactivity object can include: an image to be viewed by the user; an audio file to be listened to by the user; a question in text form to be presented to the user; or HTML or XML code to generate a presentation for the user.

In some embodiments, prior to presenting the interactivity request to the user, the system suspends execution of the script. Then, after forwarding the response from the user to the website, the system resumes execution of the script.

In some embodiments, the user-specific data includes an identifier and a password for the user.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a system that uses script technology to aggregate data from websites. While navigating through a given website, if the system detects an interactive portion of the website, the system provides an interface to a user to facilitate user interactivity with the website. The system also swaps out a process which is executing the script. Next, after obtaining information/input from the user and forwarding this information to the website, the system resumes executing the script. This system is described in more detail below.

Aggregation System

Figure 1:
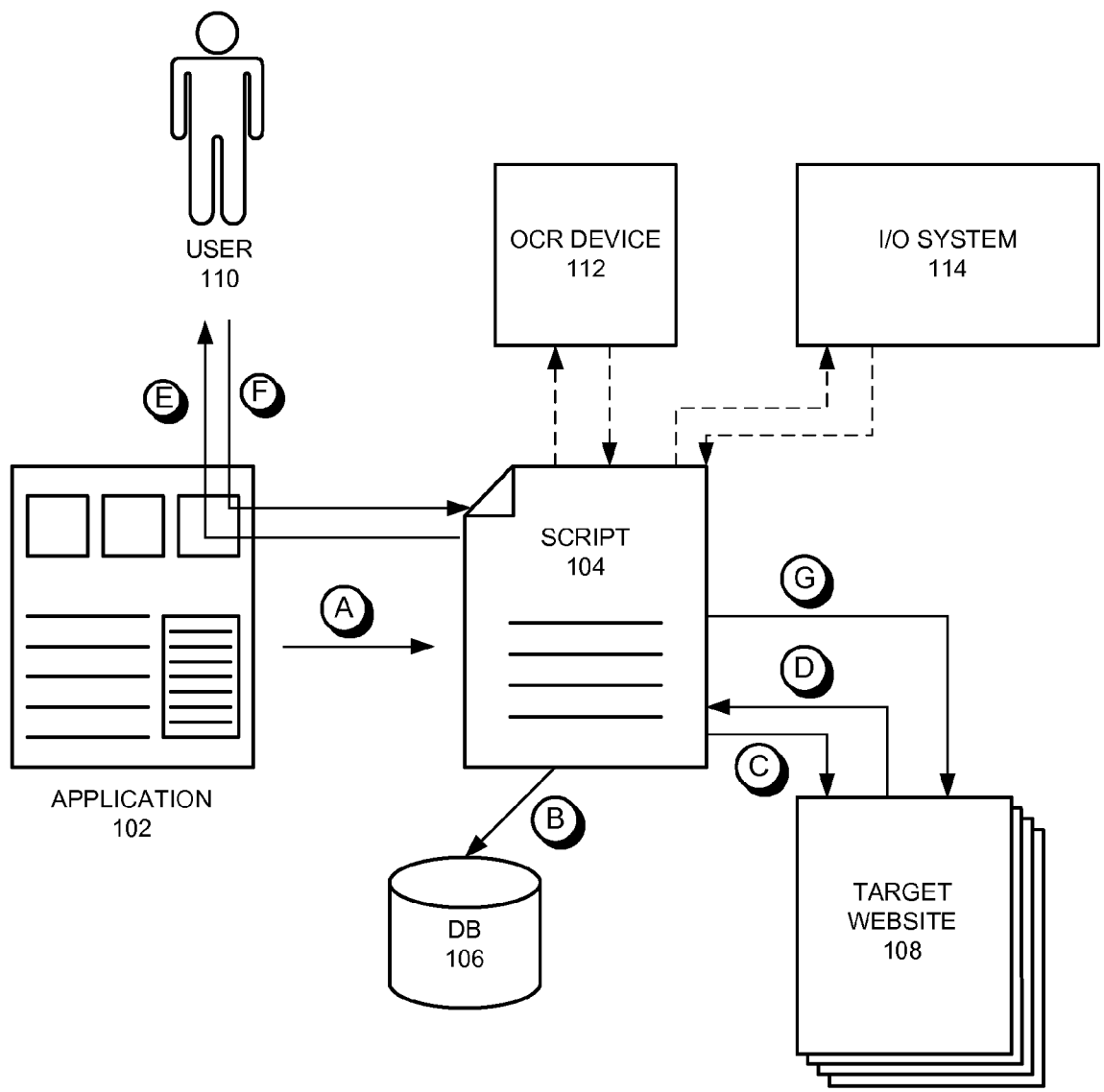
FIG. 1 illustrates an aggregation system in accordance with an embodiment of the present invention.

FIG. 1 illustrates an aggregation system in accordance with an embodiment of the present invention. This aggregation system is associated with an application 102, such as an accounting application, which is operated by a user 110. Application 102 can initiate execution of a script 104 by the aggregation system, for example by executing script 104 on a specialized script engine. Note that script 104 contains various macro-instructions which (when executed) access a target website 108.

In one embodiment of the present invention script 104 executes on a standalone application which includes a script engine. In an alternative embodiment, script 104 is executed by a script engine that is part of application 102. In yet another embodiment, the script executes within a web browser.

Script 104 includes uniform resource locators (URLs) that are directed to pages on websites, such as target website 108, as well as macro-instructions to that navigate through and parse pages on a target website 108. (Note that target website 108 can generally include any type of website from which data can be aggregated, such as a website for a financial institution.) For example, script 104 can first automatically navigate to a logon screen for a financial website. Next, the script can automatically enter a username and password into the logon screen to obtain access to an associated account-summary page. Script 104 can then determine how many accounts are associated with the account-summary page. For each of these accounts, the system can follow a corresponding URL to gather data from one or more pages associated with the account. During this process, if user interaction is required, the system allows the user to provide such input as is described below. For example, the interaction can involve the user reading an obscured word in a digital image and inputting the word as a response. In another example, the interaction can involve the user answering a question in text form, such as "what is your mother's maiden name?"

The aggregation system also includes a database (DB) 106 (or some other type of repository) which contains user-supplied information, such as passwords or credentials, that are used to gain access to various accounts on various websites.

Instead of interacting with user 110, the system can alternatively interact with a device or a computer system. For example, the system can interact with an optical character recognition (OCR) device 112, which, for example, can automatically read a word in a digital image. In general, the system can interact with any type of device or computer system that can perform some type of interaction, for example, such as input/output (I/O) system 114.

In yet another embodiment, instead of interacting with the user, the system can interact with a person who is "on-call" to respond to queries on behalf of users. For example, the person who is on-call might be employed by an organization (such as a call center) to answer such queries on behalf of users.

Facilitating Interactivity During the Navigation Process

Figure 2:
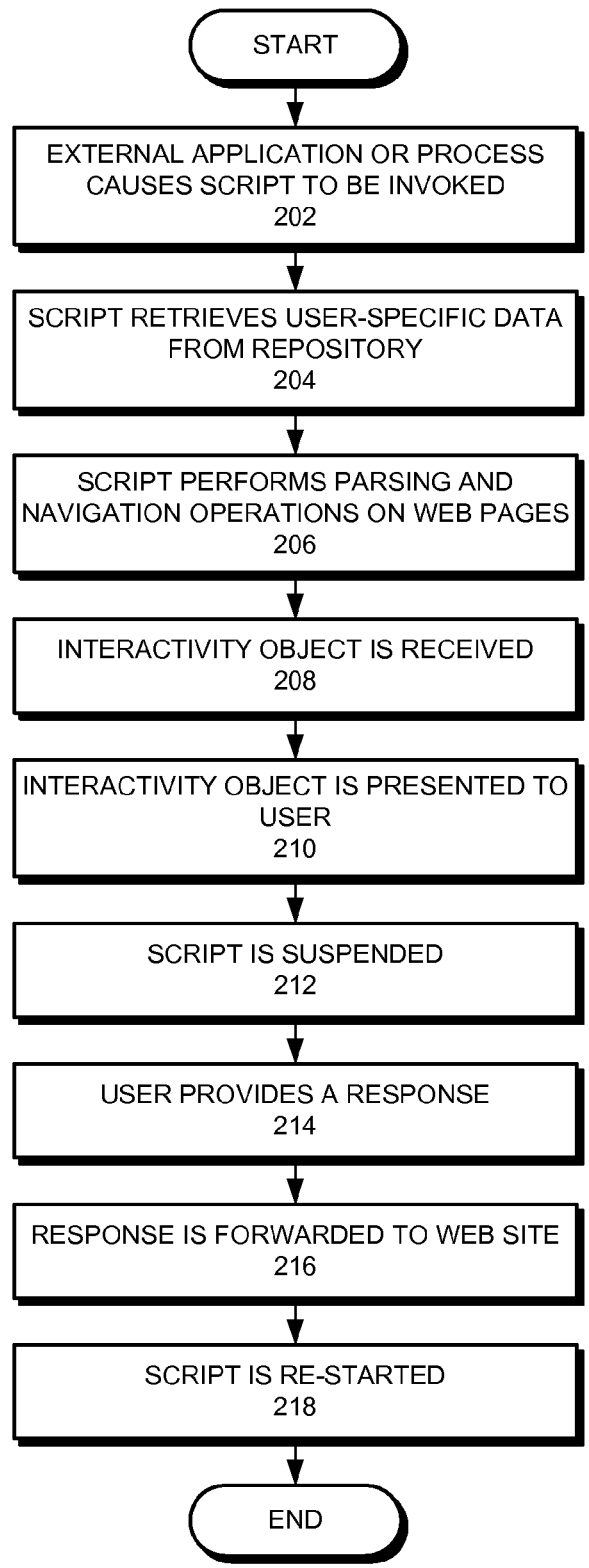
FIG. 2 presents a flow chart illustrating the process of facilitating interactivity while navigating through a website in accordance with an embodiment of the present invention.

FIG. 2 presents a flow chart illustrating the process of facilitating interactivity while navigating through a website in accordance with an embodiment of the present invention. At the start of this process, an external program (or a batch process) causes a script to be invoked (step 202).

Next, the script retrieves user-specific data for a website (such as a username and password) from a repository (such as database 106) (step 204). The script then uses this user-specific data to log on to the website.

Next, the script interacts with the website. This can involve performing "page parsing" operations on web pages to retrieve data from the website and to ascertain the structure of the website. It can also involve performing various navigation operations through various web pages on the website (step 206).

While accessing the website, the website can generate an interactivity request which can be in the form of an "interactivity object" (step 208). In one embodiment of the present invention, the interactivity object is an object defined within an object-oriented programming system. Note that this interactivity object can encapsulate different data types associated with different types of interactivity requests. For example, the interactivity object can include: an image to be viewed by the user; an audio file to be listened to by the user; a question in text form to be presented to the user; or HTML or XML code to generate a presentation to be presented to the user. Note that an HTML presentation can provide a drop-down menu with options that a user can select.

In response to receiving the interactivity object, the system presents the interactivity object to a user 110 of the application 102 which invoked the script. Note that this can involve presenting the interactivity object to user 110 through a user interface for application 102. For example, the user might be asked to recognize an obscured word in a digital image or to recognize some music in an audio file.

In one embodiment of the present invention, the script is then suspended (step 212) while the user takes time to respond. This enables other scripts to run on the script engine.

Next, the user provides a response (step 214), which for example may involve inputting a recognized word or a recognized piece of music, and the response is forwarded to the website (step 216).

In one embodiment of the present invention, the answer is stored by the system in database 106, so that when the same interactivity request is encountered, the system can automatically provide the response instead of asking the user to provide the response again. This feature prevents the user from having to respond to the same query again.

Also note that the response might include biometric data from the user, such as a fingerprint scan or a retina scan.

Finally, the script is re-started to continue processing from where it left off (step 218). Note that when the script is suspended a certain amount of state information must be saved for the script, and when the script is re-started the saved state information needs to be restored.

Macro Language Extensions

Note that a number of extensions can be made to the macro-language in which the scripts are written to facilitate the above-described process.

(1) The macro-language can be extended to obtain interactivity objects to facilitate user interaction.
(2) The macro language can be extended to provide support for suspending execution of a script while a user is responding.
(3) The macro language can be extended to send a query to a user or a third-party system.
(4) The macro language can be extended to receive a response to a query from a user or a third-party system.
(5) The macro language can also be extended to unsuspend or revive a script after a user has responded.

Script API

In one embodiment of the present invention, the system supports invoking and communicating with scripts, such as script 104, through a specialized application programming interface (API), such as a web-services API. This allows the scripts to accept direct requests through the API.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for facilitating interactivity during automated web-site accesses on behalf of a user, comprising:
selecting, for execution at a computer, a first script from a set of scripts;
executing, at a computer, the first script which accesses one or more websites, wherein executing the first script initially comprises:
retrieving previously stored authentication credentials associated with the user;
automatically navigating to a target website on behalf of the user;
in response to receiving a request for authorization information from the target website, sending the retrieved authorization credentials to the target website;
prior to the getting logged onto the target website on behalf of the user, receiving an interactivity request generated by the target website, wherein the interactivity request specifies information that requires a response from the user by using an object and requiring that the user interact with the object, and wherein the specified information requiring a response is in addition to the previously sent authorization credentials, wherein the response is based on the interaction with the object, and wherein the object includes at least one of an image to be viewed by the user, an audio file to be listened to by the user, a question in text form to be presented to the user, or HTML or XML code to generate a presentation for the user;
presenting the interactivity request to the user; and
suspending execution of the first script to wait for the response from the user to the interactivity request;
subsequent to suspending execution of the first script, and prior to receiving a response to the interactivity request from the user, selecting, for execution, a second script from the set of scripts, wherein the second script is not the first script;
executing, at the computer, the selected second script;
upon receiving a response to the interactivity request from the user,
forwarding the response from the user to the target website;
suspending the execution of the second script; and
subsequently resuming execution of the first script.

2. The method of claim 1, wherein resuming execution of the first script involves:
logging the user onto the target website;
accessing the target website; and
performing navigation operations through web pages in the target website.

3. The method of claim 2, wherein accessing the target website involves performing parsing operations to extract data from web pages in the target website.

4. The method of claim 2, wherein accessing the target website involves aggregating account information for the user from the target website.

5. The method of claim 1, wherein the interactivity object encapsulates different data types associated with different types of interactivity requests.

6. The method of claim 1, wherein the previously stored authentication credentials include an identifier and a password for the user.

7. A non-transitory computer-readable storage medium storing instructions that when executed by a computer cause the computer to perform a method for facilitating interactivity during automated web-site accesses on behalf of a user, comprising:
selecting, for execution at a computer, a first script from a set of scripts;
executing the first script which accesses one or more websites, wherein executing the first script initially comprises:
retrieving previously stored authentication credentials associated with the user;
automatically navigating to a target website on behalf of the user;
in response to receiving a request for authorization information from the target website, sending the retrieved authorization credentials to the target website;
prior to getting logged onto the target website on behalf of the user, receiving an interactivity request generated by the target website, wherein the interactivity request specifies information that requires a response from the user by using an object and requiring that the user interact with the object, and wherein the specified information requiring a response is in addition to the previously sent authorization credentials, wherein the response is based on the interaction with the object, and wherein the object includes at least one of an image to be viewed by the user, an audio file to be listened to by the user, a question in text form to be presented to the user, or HTML or XML code to generate a presentation for the user;
presenting the interactivity request to the user; and
suspending execution of the first script to wait for the response from the user to the presented interactivity request;
subsequent to suspending execution of the first script, and prior to receiving a response to the interactivity request from the user, selecting, for execution, a second script from the set of scripts, wherein the second script is not the first script;
executing, at the computer, the selected second script;
upon receiving a response to the interactivity request from the user,
forwarding the response from the user to the target website;
suspending the execution of the second script; and
subsequently resuming execution of the first script.

8. The non-transitory computer-readable storage medium of claim 7, wherein resuming execution of the first script involves:
logging the user onto the target website;
accessing the target website; and
performing navigation operations through web pages in the target website.

9. The non-transitory computer-readable storage medium of claim 8, wherein accessing the target website involves performing parsing operations to extract data from web pages in the target website.

10. The non-transitory computer-readable storage medium of claim 8, wherein accessing the target website involves aggregating account information for the user from the target website.

11. The non-transitory computer-readable storage medium of claim 7, wherein the interactivity object encapsulates different data types associated with different types of interactivity requests.

12. The non-transitory computer-readable storage medium of claim 7, wherein the previously stored authentication credentials include an identifier and a password for the user.

13. An apparatus that facilitates interactivity during automated web-site accesses on behalf of a user, comprising:
- a memory;
- a processor;
- a selection engine configured to select, for execution at a computer, a first script from a set of scripts;
- an execution engine configured to execute the first script which accesses one or more websites, wherein executing the first script initially comprises:
  - retrieving previously stored authentication credentials associated with a user;
  - automatically navigating to a target website on behalf of the user;
  - in response to a receiving a request for authorization information from the target website, sending the retrieved authorization credentials to the target website;
  - prior to getting logged onto the target website on behalf of the user, receiving an interactivity request generated by the target website, wherein the interactivity request specifies information that requires a response from the user by using an object and requiring that the user interact with the object, and wherein the specified information requiring a response is in addition to the previously sent authorization credentials, wherein the response is based on the interaction with the object, and wherein the object includes at least one of an image to be viewed by the user, an audio file to be listened to by the user, a question in text form to be presented to the user, or HTML or XML code to generate a presentation for the user;
  - presenting the interactivity request to the user; and
  - suspending execution of the first script to wait for the response from the user to the presented interactivity request;
- the selection engine further configured to, subsequent to suspending execution of the first script, and prior to receiving a response to the interactivity request from the user, select, for execution, a second script from the set of scripts, wherein the second script is not the first script;
- the execution engine further configured to execute, at the computer, the selected second script;
- the execution engine further configured to, upon receiving a response to the interactivity request from the user,
  - forward the response from the user to the target website;
  - suspend the execution of the second script; and
  - subsequently resume execution of the first script.

14. The apparatus of claim 13, wherein resuming execution of the first script involves:
- logging the user onto the target website;
- accessing the target website; and
- performing navigation operations through web pages in the target website.

15. The apparatus of claim 14, wherein while accessing the target website, the script performs parsing operations to extract data from web pages in the target website.

16. The apparatus of claim 14, wherein while accessing the target website, the script aggregates account information for the user from the target website.

17. The apparatus of claim 13, wherein while receiving the interactivity request, the execution engine and the script are configured to receive an interactivity object which can encapsulate different data types associated with different types of interactivity requests.

18. The apparatus of claim 13, wherein the previously stored authentication credentials include an identifier and a password for the user.

* * * * *